(12) United States Patent
Zec et al.

(10) Patent No.: US 10,848,037 B2
(45) Date of Patent: Nov. 24, 2020

(54) PERMANENT MAGNET ROTOR, METHOD FOR THE PRODUCTION THEREOF USING A MAGNETIZING FIXTURE

(71) Applicant: Bühler Motor GmbH, Nuremberg (DE)

(72) Inventors: Mladen Zec, Nuremberg (DE); Armin Suttner-Reimann, Schwabach (DE); Heinz Günther, Oberasbach (DE)

(73) Assignee: BÜHLER MOTOR GMBH, Nuremberg (DE)

( * ) Notice: Subject to any disclaimer, the term of this patent is extended or adjusted under 35 U.S.C. 154(b) by 153 days.

(21) Appl. No.: 16/130,148

(22) Filed: Sep. 13, 2018

(65) Prior Publication Data
US 2019/0097504 A1 Mar. 28, 2019

(30) Foreign Application Priority Data
Sep. 28, 2017 (DE) .......................... 10 2017 217 282

(51) Int. Cl.
*H02K 15/03* (2006.01)
*H02K 1/27* (2006.01)
*H02K 21/04* (2006.01)

(52) U.S. Cl.
CPC ............ *H02K 15/03* (2013.01); *H02K 1/276* (2013.01); *H02K 1/2766* (2013.01); *H02K 21/042* (2013.01); *H02K 2201/06* (2013.01)

(58) Field of Classification Search
CPC ........ H02K 1/28; H02K 1/2766; H02K 15/03; H02K 2201/06; H02K 21/042; H02K 1/276; H02K 1/2773; H02K 15/16; H02K 15/165

USPC .......................................... 310/156.01, 156.48
See application file for complete search history.

(56) References Cited

U.S. PATENT DOCUMENTS

| | | | |
|---|---|---|---|
| 8,922,084 B2 * | 12/2014 | Nagai .................. | H02K 1/2766 310/156.53 |
| 10,505,418 B2 * | 12/2019 | Baraka ..................... | H02K 3/04 |
| 2014/0285049 A1 | 9/2014 | Nimura et al. | |
| 2015/0028710 A1 * | 1/2015 | Oka ........................ | H02K 15/03 310/156.48 |
| 2016/0225499 A1 | 8/2016 | Han et al. | |

(Continued)

FOREIGN PATENT DOCUMENTS

| DE | 10 2007 029 719 A1 | 8/2008 |
|---|---|---|
| DE | 11 2013 002 622 T5 | 3/2015 |
| DE | 10 2015 222 271 A1 | 5/2017 |

OTHER PUBLICATIONS

Search Report dated Sep. 28, 2017, issued in counterpart German Patent Application No. 10 2017 217 282.7 (6 pages).

*Primary Examiner* — Forrest M Phillips
(74) *Attorney, Agent, or Firm* — Westerman, Hattori, Daniels & Adrian, LLP

(57) ABSTRACT

A permanent magnet rotor (1) with a magnetically conductive magnetic core (2), which has a plurality of magnet retainers (3, 4) for radially arranged and essentially tangentially magnetized permanent magnet parts (9), and a method for the production thereof. With a common permanent magnet rotor, the object of the present invention is to ensure a simple installation for a low number of components to be installed, very good magnetizability, high strength of the mechanical connection of the permanent magnet parts in the magnet retainers, and a compact size.

6 Claims, 6 Drawing Sheets

(56) References Cited

U.S. PATENT DOCUMENTS

2017/0366056 A1* 12/2017 Tang .................... H02K 1/2766
2018/0097412 A1* 4/2018 Xiao .................... H02K 1/2766

* cited by examiner

PERMANENT MAGNET ROTOR, METHOD FOR THE PRODUCTION THEREOF USING A MAGNETIZING FIXTURE

CROSS-REFERENCE TO RELATED APPLICATIONS

The present patent application is based on, and claims priority from, German Application No. DE 10 2017 217 282.7, filed Sep. 28, 2017, which is incorporated herein by reference in their entireties.

BACKGROUND OF THE INVENTION

(1) Field of the Invention

The invention relates to a permanent magnet rotor with a magnetically conductive magnetic core, which has a plurality of magnet retainers for radially arranged and essentially tangentially magnetized permanent magnet parts, and a method for the production thereof.

(2) Description of the Related Art Including Information Disclosed Under 37 CFR 1.97 and 1.98

A common permanent magnet rotor is known, for example, from US 2016225499 A1, in which the permanent magnet parts are retained, tangentially magnetized, in magnet retainers of a magnetic core.

DE 10 2015 222 271 A1 discloses a permanent magnet rotor, which consists of a magnetically conductive magnetic core with a plurality of magnet retainers, in the form of magnetic pockets. The permanent magnet parts extend axially over two sub-cores in a straight line. This enables the total number of parts to be installed to be significantly reduced. The disadvantage here is that the sub-cores do not twist against each other due to the installed permanent magnet parts. Therefore, in order to reduce the cogging torque between the rotor and the stator of an electric motor, the pole surfaces of the two sub-cores of the permanent magnet rotor are shaped differently. In order to magnetize the magnets, the magnets must either be magnetized before installation or the entire rotor must be magnetized after installation. Both options have significant disadvantages. With magnetization in advance, it is very difficult to install the magnets, especially when using rare-earth magnets. A preinstalled permanent magnet rotor can be magnetized externally, but the achievable magnetic field strength is limited due to the saturation effects in the iron core such that some areas of the magnets are not completely magnetized.

BRIEF SUMMARY OF THE INVENTION

With a common permanent magnet rotor, the object of the present invention is to ensure a simple installation for a low number of components to be installed, very good magnetizability, high strength of the mechanical connection of the permanent magnet parts in the magnet retainers, and a compact size.

Because the magnets are arranged radially, a stronger magnetic field can generally be achieved. In addition, it is easier for the magnetizing coils to approach the magnetizing permanent magnets, and the iron portion to be overcome is in the magnetizing direction and supports magnetic flux control.

The two sub-cores enable the permanent magnet parts to establish a stronger mechanical connection with a first sub-core than with a second sub-core. In doing so, the stronger connection preferably is already establish during magnetization of the permanent magnet parts. The less-strong mechanical connection is designed for a simple installation. It should ensure an easy, uncomplicated installation of the two sub-cores with the preassembled permanent magnet parts and the risk of damage to the permanent magnet parts is excluded to the extent possible. Insertion angles on the permanent magnet parts and/or the sub-cores can additionally facilitate the installation.

A provision is that different permanent magnet parts establish a stronger mechanical connection and a less-strong mechanical connection thereto, so as to alternate, in different magnet retainers over the periphery of a sub-core. Each preassembled permanent magnet part is thereby surrounded by empty magnet retainers in an intermediate step.

The stronger mechanical connection is preferably established through injection molding, bonding, pressing (press fitting), or clamping, or even through a combination of these options. When clamping, protruding sheet-metal tabs are normally flexibly implemented within the magnet retainer, often with recesses between the sheet-metal tabs, which facilitate the flexibility and, to some extent, also a deformability in the sheet-metal tabs. With the injection molding of a plastic material, which can be thermally plasticized and processed using injection molding, there is normally the risk that a thermally constrained partial demagnetization will occur with magnetized permanent magnets. However, with the present invention, the intention is to carry out this injection molding before the magnetization of the permanent magnetic parts. This avoids the aforementioned partial demagnetization.

The less-strong mechanical connection is beneficially a clearance or transition fit. More important here is a simple installation capacity and less so a decidedly firm attachment. The connection should specifically be designed such that vibrations and undesired noises or migration of the magnets do not occur. The magnetic resistance also should not be negatively changed due to an excessively generous design to the extent possible.

The strength of a connection between rotor assemblies, consisting of a sub-core and installed permanent magnet parts, can be achieved through a firm connection between the sub-cores and a rotor shaft. This may be a typical press-fit or a different type of connection known from the prior art, such as welding or bonding.

In general, the permanent magnet parts can be connected to a magnet retainer by means of flexible sheet-metal tabs. With a fully installed permanent magnet rotor, a provision is that the sheet-metal tabs of the connecting sub-cores are deflected in the respective opposite direction. The same technology can also be transferred to the connection between the sub-cores and the rotor shaft.

The sub-cores themselves either consist of pressed metal powder or stacks of sheets, which are produced, in particular, by means of a punch-packaging process. In doing so, the sheets are connected to one another by means of tabs pressed into the recesses. If the permanent magnet parts are injection-molded, the individual sheets of the stack of sheets can be additionally firmly attached; the same thing applies to bonding and other types of connections.

Especially advantageously, the sub-cores and/or two rotor assemblies, each consisting of one sub-core and multiple permanent magnet parts inserted therein, are to be formed identically or practically identically, wherein a permanent magnet piece is retained in every other magnet retainer. The magnetization is also preferably identical or practically identical (with the same geometric arrangement). If a rotor assembly is rotated 180°, the magnetization of the permanent magnet parts reverses accordingly and corresponds to sub-cores N-N or S-S, which are joined together, such that the field lines deflect radially in the desired manner and form pronounced rotor poles.

As an alternative, the permanent magnet rotor can be installed in that two magnetized rotor assemblies are joined to a rotor shaft, simultaneously or one after the other, and firmly connected thereto, wherein the available subsections of the permanent magnet parts are inserted, simultaneously or subsequently, into the wide magnet retainers of the sub-core of the other respective rotor assembly. In this case, the rotor assemblies can be joined to the rotor shaft via the same end of the rotor, or one rotor assembly is pushed via a first rotor end and the other rotor assembly is pushed via a second rotor end. In the latter case, flexible sheet-metal tabs would deflect in the opposite directions and thus block removal of the rotor assemblies in both directions.

The permanent magnet parts have a very large protrusion over the sub-core. This has very extensive advantages for the production process, because this protrusion represents a large guide length. Thus, the permanent magnet parts and the rotor assemblies can be retained very well and positioned precisely, wherein damage and wear are avoidable.

The object of the invention is further achieved by means of a method for producing a permanent magnet rotor, in which the following steps are intended:
1. Providing multiple non-magnetized permanent magnet parts;
2. Magnetizing the permanent magnet parts in a conventional magnetizing fixture;
3. Providing a sub-core and the multiple pre-magnetized permanent magnet parts; and
4. Inserting the multiple magnetized permanent magnet parts having a subsection into every other magnet retainer of the sub-core, whereby a rotor assembly is produced.

The pre-magnetization of individual permanent magnet parts is known from the prior art. What is novel in the present invention is that these permanent magnet parts having a subsection are inserted into every other magnet retainer of a sub-core, whereby a rotor assembly is produced. Because the permanent magnet parts can only be firmly inserted into the sub-core over a part of their length, the remaining part can be simply retained and/or guided for installation. For a reliable retaining of the permanent magnet parts, it is sufficient if they are only partially firmly connected to a sub-core. However, it is easier to insert non-magnetized permanent magnet parts.

The object of the invention is preferably achieved by means of an improved method for producing a permanent magnet rotor, in which the following steps are intended:
1. Providing a sub-core and multiple permanent magnet parts;
2. Inserting multiple non-magnetized permanent magnet parts having a subsection into every other magnet retainer of the sub-core, whereby a rotor assembly is produced;
3. Inserting the rotor assembly into a magnetizing fixture, wherein magnetizing coils are guided into magnet retainers, not equipped with permanent magnet parts, of the sub-core of the rotor assembly and available subsections of the permanent magnet parts, which project from the sub-core, and are inserted into magnet recesses of a magnetizing element of the magnetizing fixture;
4. Simultaneous magnetizing of both subsections of the permanent magnet parts; and
5. Ejecting the rotor assembly from the magnetizing fixture.

The permanent magnet parts can be easily fully magnetized by means of the method according to the invention, particularly if the permanent magnet parts consist of rare-earth material, e.g. NdFeB.

The insertion of permanent magnet parts into every other magnet retainer of a sub-core takes place as previously mentioned either through pressing, clamping, injection molding, bonding, or through a combination of several of these options. A rotor assembly is hereby produced.

By inserting the rotor assembly into a magnetizing fixture, wherein magnetizing coils are guided into magnet retainers, not equipped with permanent magnet parts, of the sub-core of the rotor assembly and available subsections of the permanent magnet parts, which protrude from out of the sub-core, and are inserted into magnet recesses of a magnetizing element of the magnetizing fixture, both subsections of the permanent magnet parts can be magnetized simultaneously. The magnetization direction here is aligned tangentially and the same for each permanent magnet part such that an annular magnet field results. Thereby a high magnetization field strength is achievable.

The magnetized rotor assembly can be easily ejected from the magnetizing fixture.

A further provision is that two rotor assemblies can be combined by inserting the available subsections of the multiple permanent magnet parts into the multiple available magnet retainers of the other respective sub-core. To this end, there are two sub-cores having permanent magnet parts installed over half or essentially half, in an intermediate step, wherein an occupied magnet retainer alternates with an unoccupied magnet retainer. The preassembled sub-cores resemble claw clutches, which can be inserted into one another.

The rotor assemblies can establish a firm connection with one another through various means. A very simple option is to press both assemblies onto a rotor shaft or to connect to the rotor shaft in another known manner, e.g. through welding.

The two magnetized rotor assemblies can also establish a connection to the rotor shaft (28) without previously connecting the two rotor assemblies. It is conceivable for the permanent magnet rotors to be joined to a rotor shaft, simultaneously or one after the other, and firmly connected thereto, wherein the available subsections of the permanent magnet parts are inserted, simultaneously or subsequently in a first method step, into the still available wide magnet retainers of the sub-core of the other respective rotor assembly.

A magnetizing fixture is conceived having a magnetizing element with $2n$ magnet recesses, n magnetizing coils, which are retained in every other magnet recess, wherein a large part of the magnetizing coils protrudes axially from the magnetizing element, and a retaining device, which is arranged at least between two magnetizing coils. The magnetizing fixture according to the invention is especially suitable for generating strong rotor magnet fields, because the magnetizing coils can be arranged optimally to the permanent magnet parts to be magnetized. This also enables the magnets to be magnetized after partial installation, whereby the production process is significantly facilitated. A provision is that the magnetizing coils, which are retained in the magnetizing element, protrude axially from the magnetizing element over at least one uniformly sized part. In this manner, two sub-cores can be combined into one permanent magnet rotor.

Expediently, the goal is that the magnetizing coils, which are retained in the magnetizing element, protrude axially from the magnetizing element over a significantly larger part. In this manner, one single magnetizing fixture or one type of a magnetizing fixture enables the magnetization of a plurality of permanent magnet rotors, rotor assemblies, and sub-cores of varying lengths. With the longer magnetizing coils, the retaining device must also be adapted with new measurements accordingly.

A firm connection between the magnetizing cores and the coil support plate ensures a stable magnetizing fixture. The connection can also be produced through a threaded connection or even take place after the installation of a coil wire, depending on the geometric configuration of the coils. Other types of connection, such as soldering or pressing, are also possible.

It is advantageous when the magnetizing coils are wound onto magnetizing cores, which consist of a magnetically conductive steel material, wherein a coil wire is pressed, in a positive-locking manner, into a groove on the periphery of the magnetizing cores. The steel material conducts the magnetic flux especially well and the fitting of the coil wire ensures that the forces occurring on the coil wire during the magnetization process can be accommodated by the surrounding steel material.

However, it may be beneficial to additionally secure the coil wire in the groove through bonding, or through a UV-cured casting compound, or a combination of these methods.

The magnetizing coils have connections, which are cast in a base of the magnetizing fixture. This secures the connections and the connecting wires between the coils against deflection and thus against a fatigue fracture. The base can also be used as an attachment flange.

BRIEF DESCRIPTION OF THE SEVERAL VIEWS OF THE DRAWINGS

The exemplary embodiments of the invention are subsequently further explained, based on the drawings. The following is shown.

DETAILED DESCRIPTION OF THE INVENTION

Figure 1:
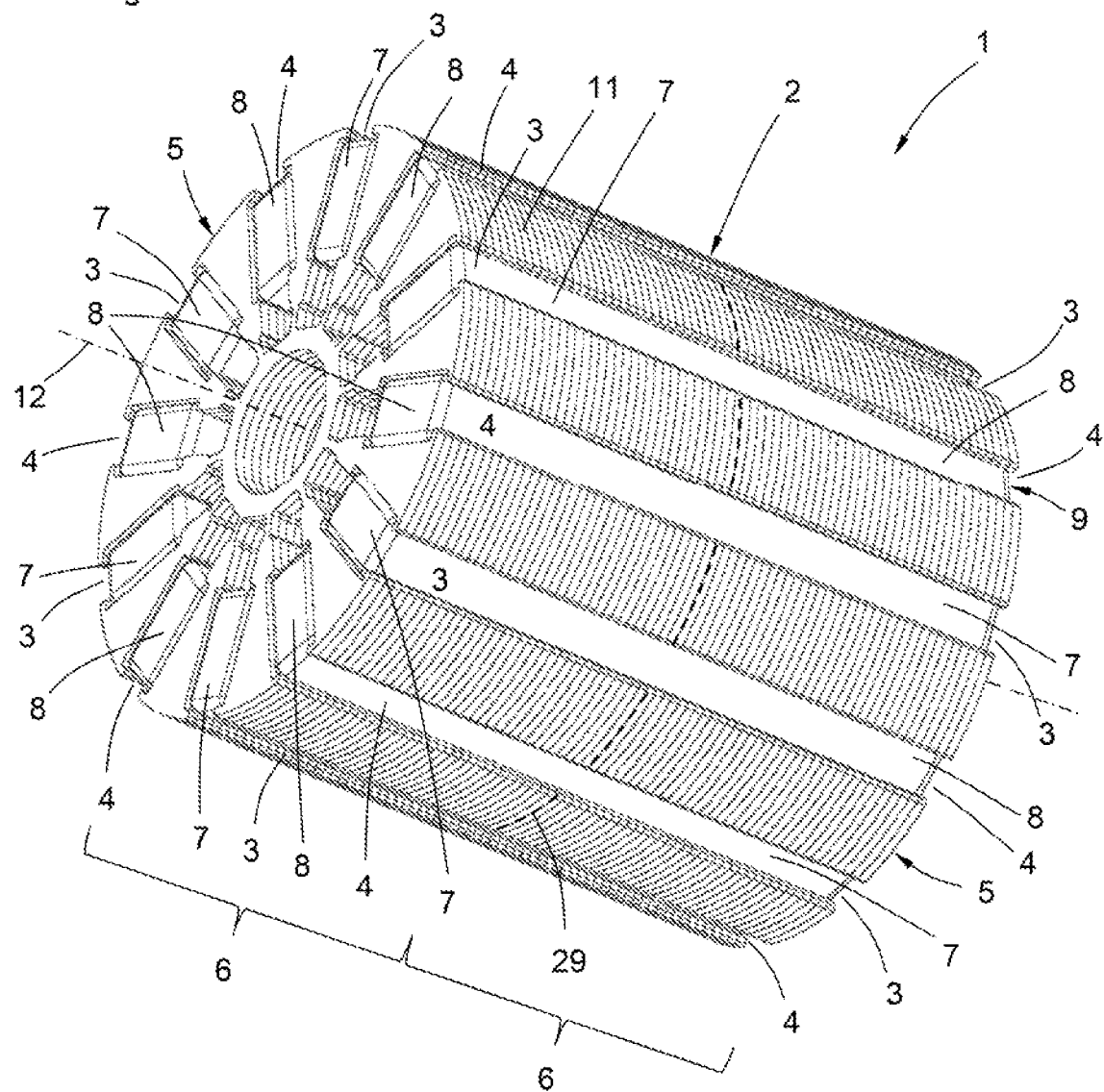
FIG. 1 shows a permanent magnet rotor according to the invention.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

FIG. 1 shows a permanent magnet rotor 1 (without rotor shaft), having a rotor axis of rotation 12, a magnetic core 2, and permanent magnet parts 9 installed in the magnet retainers 3, 4. The magnetic core 2 is axially composed of two identical sub-cores 5 (see separating line 29). The permanent magnet parts 9 are each retained with a first subsection 7 in the magnet retainers 3 of a sub-core 5 and retained with a second subsection 8 in the magnet retainers 4 of a second sub-core 5. In every other magnet retainer 3 of the two sub-cores 5, the first subsections 7 are installed with a press-fit and with a clearance or transition fit in the remaining magnet retainers 4. Each sub-core 5 forms one rotor assembly 6 with multiple permanent magnet parts 9. FIG. 1 shows twelve permanent magnet parts 9, in which six permanent magnet parts with a sub-core 5 form one rotor assembly 6. Two rotor assemblies 6, which are identical within the production and installation accuracy, are crossed with one another and connected to a permanent magnet rotor (shown here without the rotor shaft). The strength of the connection is sufficient for carrying out the installation; it is also subsequently sufficiently increased for operation through the connection to a rotor shaft.

Figure 2:
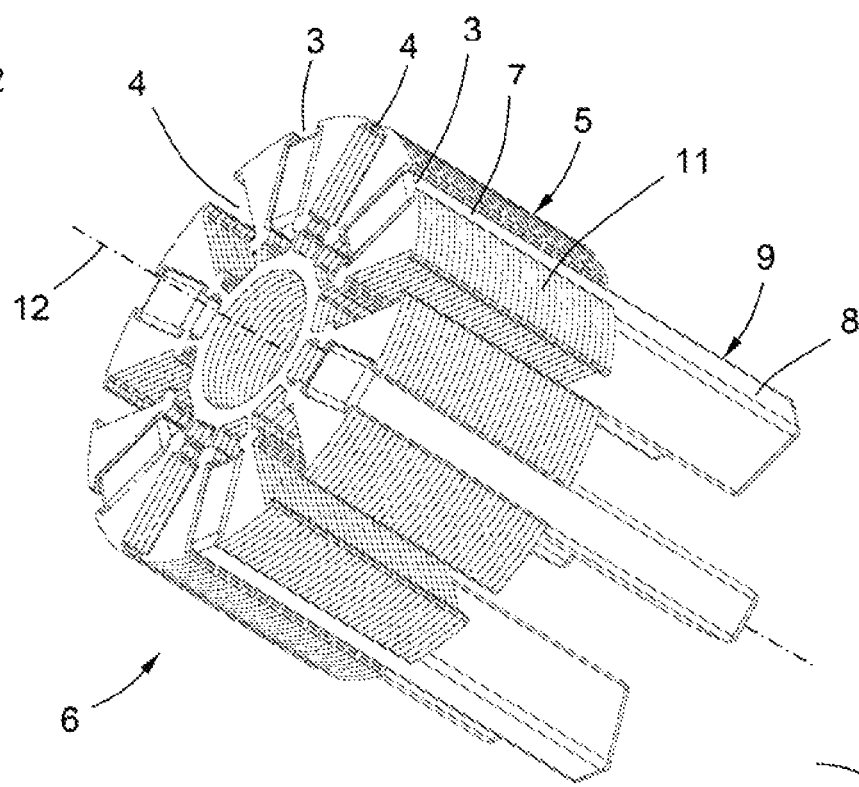
FIG. 2 shows a first sub-core with preassembled permanent magnet parts.

FIG. 2 shows the rotor assembly 6 before its installation, consisting of a sub-core 5, with a plurality of magnet retainers 3, 4 arranged around a rotor axis of rotation 12, wherein a permanent magnet piece 9 is only retained and attached in every other magnet retainer 3. The permanent magnet parts 9 and the sub-core 5 are very firmly connected to one another (press-fit). The preassembled rotor assembly resembles a claw clutch, wherein the permanent magnet parts 9 are retained in the magnet retainers 3 up to about half of their length (subsections 7), and the other half of the permanent magnet parts 9 (subsections 8) protrude freely out of the sub-core 5 parallel to the axis. The permanent magnet parts 9 are tangentially magnetized. Furthermore, sub-poles 11 are shown, which are arranged between two magnet retainers, 3 and 4, each. The sub-poles 11 are single-part components of the sub-core 5, which consists of a punch-bundled stack of sheets. The available magnet retainers 4 are slightly broader than the magnet retainers 3 occupied with permanent magnet parts 9. The breadth of the available magnet retainers 4 should be dimensioned such that they can establish a clearance or transition fit with the permanent magnet parts 9.

Figure 3:
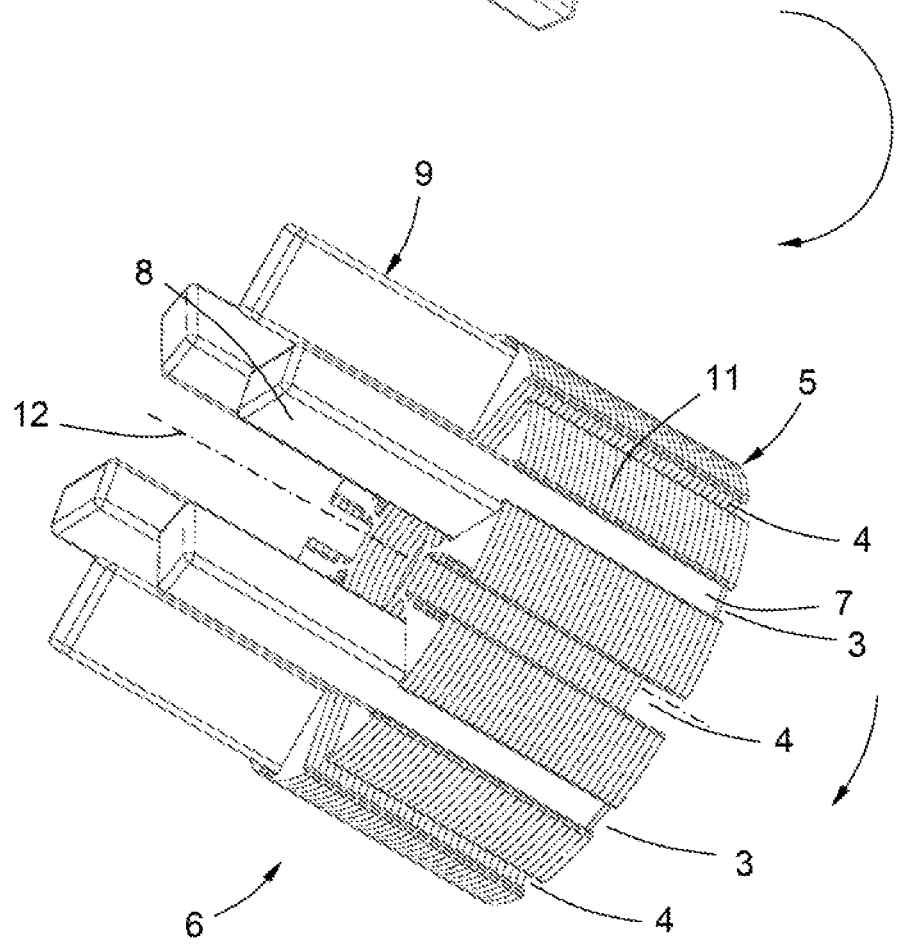
FIG. 3 shows a second sub-core with preassembled permanent magnet parts.

FIG. 3 shows a second rotor assembly 6 with preassembled permanent magnet parts 9. The permanent magnet parts have first subsections 7, which are firmly held in magnetic retainers 3, and second subsections 8, which protrude out of the sub-core 5 parallel to the axis. The permanent magnet parts 9 are tangentially magnetized. The second rotor assembly 6 is identical to the first rotor assembly 6 from FIG. 2 within the scope of the production and installation accuracy. A rotation of the rotor axis of rotation 12 of the rotor assembly 6 from FIG. 2 by 180° and a swiveling of the rotor assembly 6 by one pole pitch (by 30° here) around the rotor axis of rotation 12 results in the geometric arrangement of a second rotor assembly 6 according to FIG. 3, which can be joined with the first rotor assembly 6. Both rotor assemblies are identical, including their magnetization. Due to the aforementioned rotation, the magnetization direction of the permanent magnet parts 9 from FIG. 3, in the described arrangement, is counterclockwise to the magnetization direction of the permanent magnet parts 9 from FIG. 2, such that the magnetic field lines mutually repel in the installed state and are diverted in the radial direction. The sub-poles 11 are a single piece with the sub-core 5 and are located between two magnet retainers, 3 and 4. The available magnet retainers 4 are slightly broader than the magnet retainers 3 occupied with permanent magnet parts 9. The breadth of the available magnet retainers 4 should be dimensioned such that they can establish a clearance or transition fit with the permanent magnet parts 9.

Figure 4:
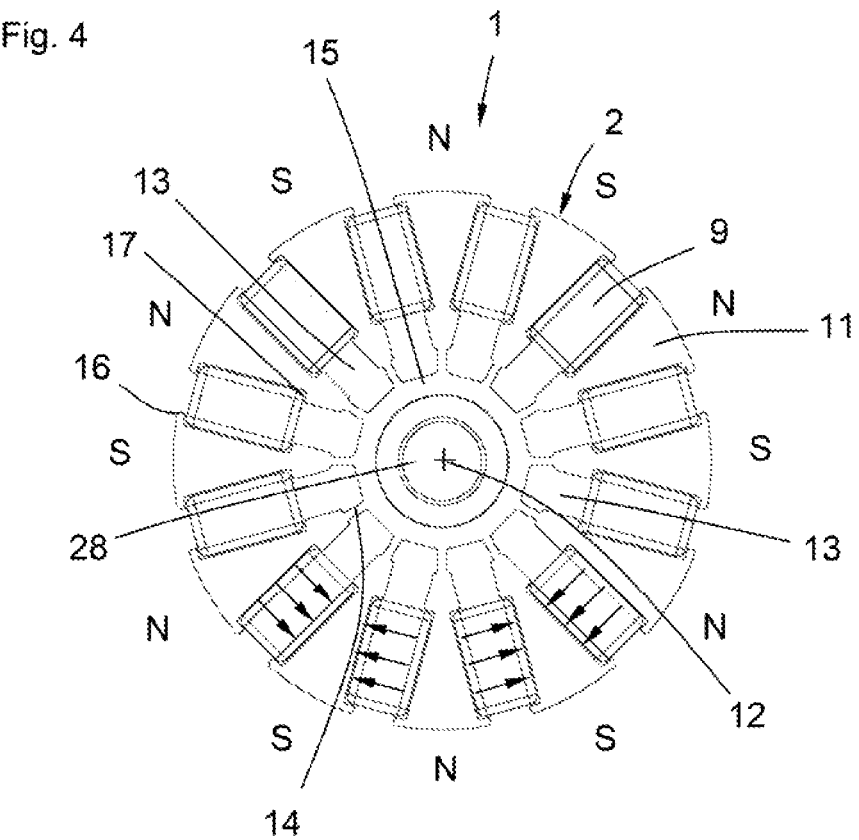
FIG. 4 shows a permanent magnet rotor fully assembled.

FIG. 4 shows a completely installed permanent magnet rotor 1, with the combined magnetic core 2, the permanent magnet parts 9, and a rotor shaft 28, onto which the magnetic core 2 is pressed. The magnetic core 2 has recesses 13 radially within the permanent magnet parts 9, which are used to suppress magnetic short-circuits. The tangential magnetization (only indicated partially) and the resulting polarity are clear. Webs 14 are provided between the recesses 13 as connecting areas between a central ring 15 and the poles 11. Protrusions 16 and stops 17 retain the permanent magnet parts radially in position.

Figure 5:
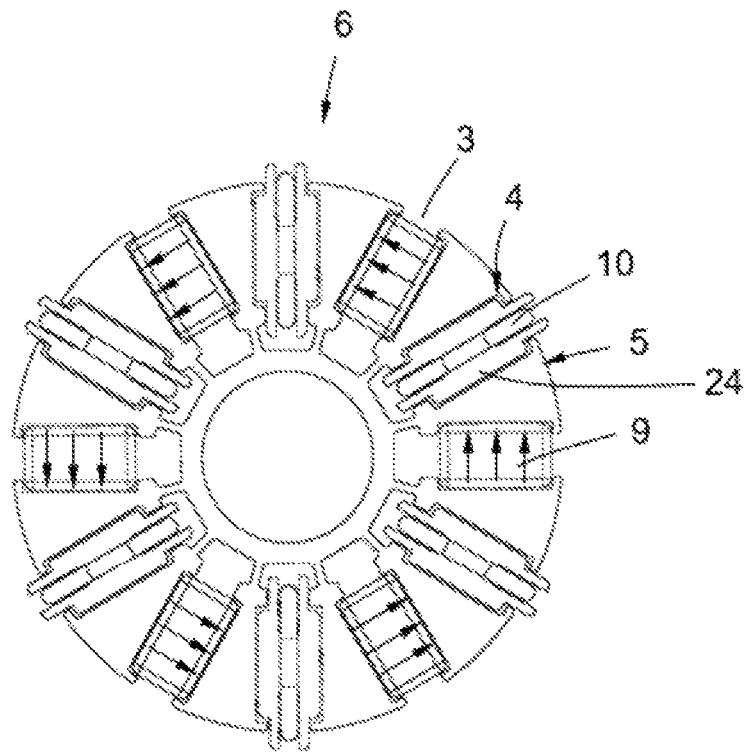
FIG. 5 shows a sub-core with magnetizing coils.

FIG. 5 shows a rotor assembly 6 with a sub-core 5, having magnetizing coils 10 wound onto magnetizing cores 24, with the coils being arranged in any available magnet retainer 4 (=every other magnet retainer). In the remaining magnet retainers 3, the permanent magnet parts 9 are attached using a press-fit. Because only every other permanent magnet piece 9 is pressed, there is an N-S-N-S sequence. This enables a magnetization direction corresponding to a ring coil.

Figure 6:
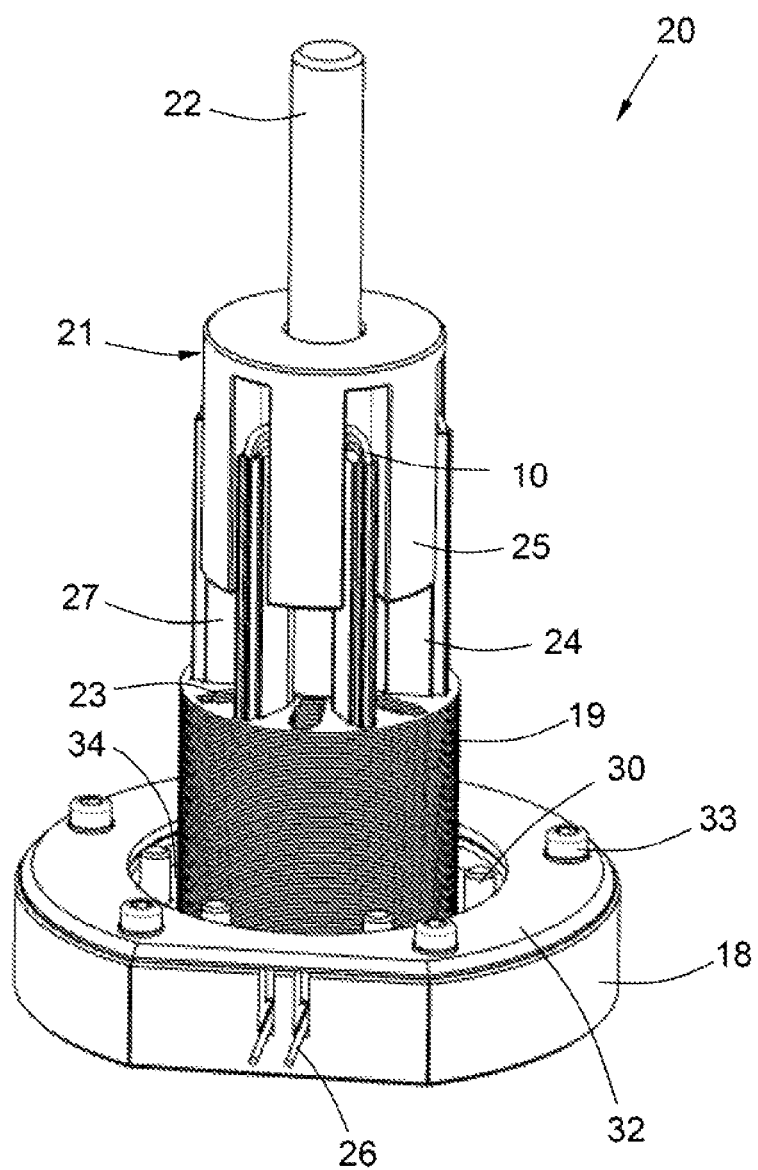
FIG. 6 shows an empty magnetizing fixture.

FIG. 6 shows a magnetizing fixture 20, having a base 18, a coil support plate 34, a ring cover 32, a retaining device 21, an ejector 22, and a magnetizing element 19, in which multiple magnetizing cores 24, each having a magnetizing coil 10, are retained. Magnet recesses 23 are provided between the magnetizing cores 24 in the magnetizing element 19, with the recesses being used to retain subsections 8 of the permanent magnet parts 9 (see FIGS. 2 and 3). The magnetizing coils 10 can be connected to a voltage source via connections 26. The retaining device 21 has retaining device fingers 25 and is used as a fixative means for a rotor assembly 6 (not shown here—see FIGS. 2 and 3). The retaining device 21 is pushed over an ejector 22, which is used to assist in the removal of the magnetized rotor assembly from the magnetizing fixture 20. To this end, the ejector 22 has a section with enlarged diameter (not discernible) at its end. The ring cover 32 is connected to the base 18 using cover screws 33. A retaining chamber 27 is used to retain the rotor assembly. The forces occurring during magnetization are accommodated in the axial direction by the retaining device 21. Housing screws 30 are used to attach a housing 31 (see FIG. 8) to the coil support plate 34. The magnetizing element 19 is attached to the coil support plate 34 (through bonding here). The magnetizing cores 24 are firmly connected to the coil carrier plate 34 (bolted here). The magnetizing coils consist of a small number of windings, which are retained in the grooves of the magnetizing cores 24 such that the windings are affixed radially. The windings are injection-molded with a plastic material as additional assurance. Hollow cavities between the base 18 and the coil support plate 34 are cast in order to affix the winding wire, particularly in the connection area, between the individual magnetizing coils and the connections. The retaining device fingers 25, the magnetizing coils 10, and the magnetizing cores 24 are designed to be longer as needed such that different rotor assemblies can be magnetized with the same magnetizing fixture.

Figure 7:
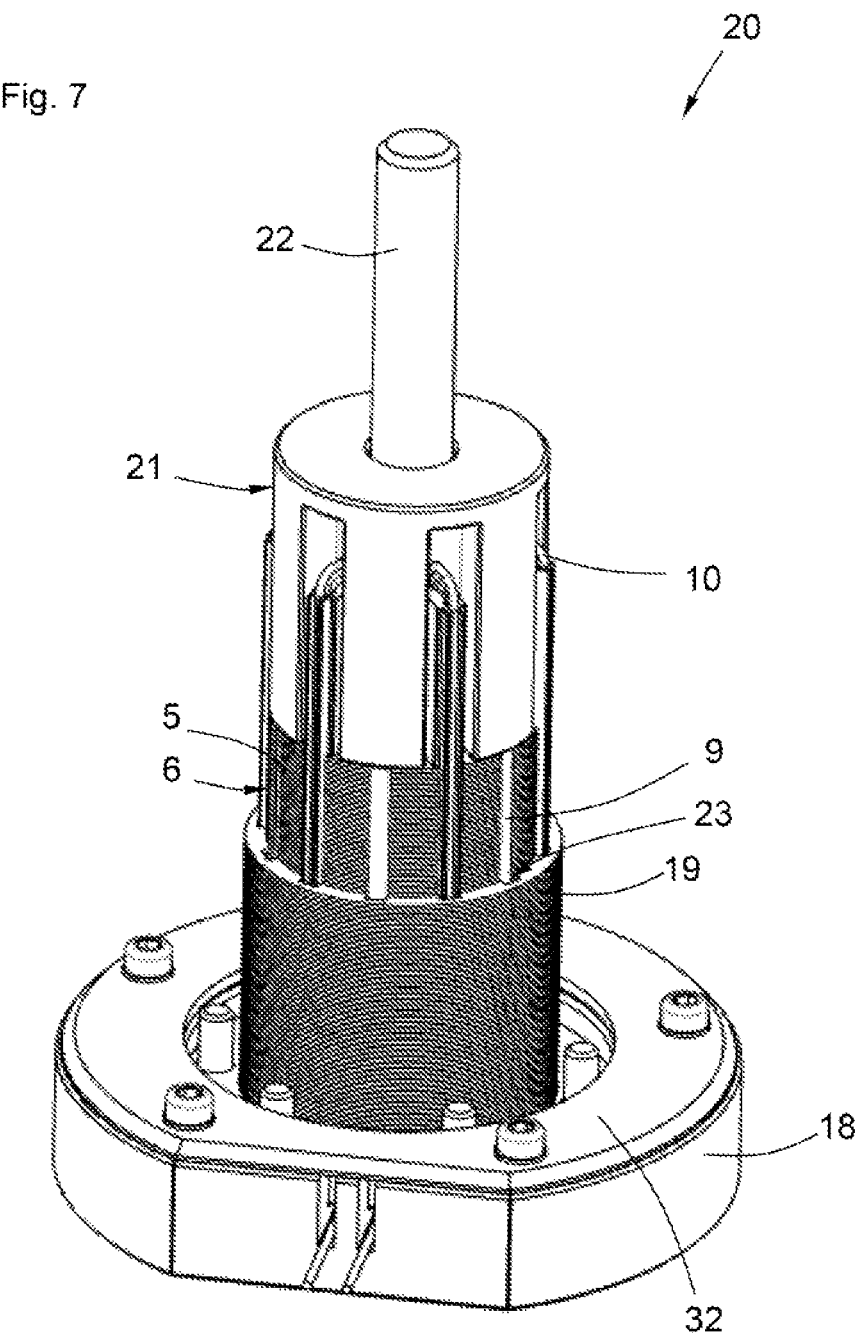
FIG. 7 shows an occupied magnetizing fixture.

FIG. 7 shows the magnetizing fixture 20, with the base 18, the ring cover 32, the ejector 22, the magnetizing element 19, magnetizing coils 10, and the retaining device 21. A rotor assembly 6 with sub-core 5 and permanent magnet parts 9 are retained within the magnetizing fixture 20. The permanent magnet parts 9 are pressed into the sub-core 5 on one side and protrude into the magnet recesses 23 on the other side (also see FIG. 6). The permanent magnet parts 9 can be magnetized in their first section, which is in the sub-core 5, and with their second section, which is in the magnet recesses 23, simultaneously by means of a magnetic flux (see FIGS. 1 to 4) extending around the rotor axis of rotation 12 (see also FIG. 5).

Figure 8:
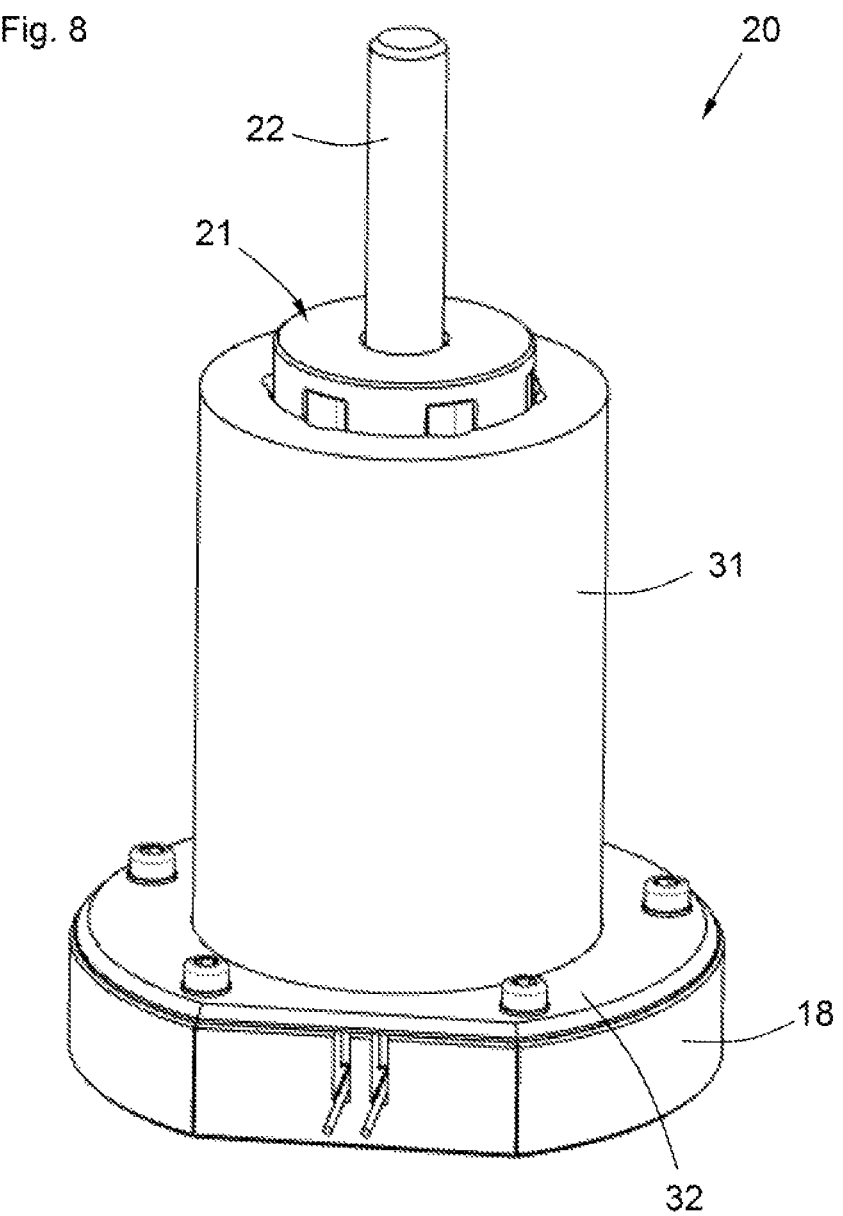
FIG. 8 shows a closed magnetizing fixture.

FIG. 8 shows a closed magnetizing fixture 20, with a sleeve-like housing 31, the coil support plate 34, the base 18, the retaining device 21, and the ejector 22, through which the magnetized rotor assembly can be removed axially from the housing 31. The housing is in the form of a cooling jacket, which can be connected to a coolant circuit to cool the magnetizing coils (connections for a cooling medium are not shown).

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

| LIST OF REFERENCE SYMBOLS | |
| --- | --- |
| 1 | Permanent magnet rotor |
| 2 | Magnetic core |
| 3 | Narrow magnet retainer |
| 4 | Broad magnet retainer |
| 5 | Sub-core |
| 6 | Rotor assembly |
| 7 | Pressed-in subsection |
| 8 | Available subsection |
| 9 | Permanent magnet part |
| 10 | Magnetizing coil |
| 11 | Sub-pole |
| 12 | Rotor axis of rotation |
| 13 | Recess |
| 14 | Web |
| 15 | Ring |
| 16 | Protrusion |
| 17 | Stop |
| 18 | Base |
| 19 | Magnetizing element |
| 20 | Magnetizing fixture |
| 21 | Retaining device |
| 22 | Ejector |
| 23 | Magnet recess |
| 24 | Magnetizing core |
| 25 | Retaining device fingers |
| 26 | Connections |
| 27 | Retaining chamber |
| 28 | Rotor shaft |
| 29 | Dividing line |
| 30 | Housing screw |
| 31 | Housing |
| 32 | Ring cover |
| 33 | Cover screw |
| 34 | Coil support plate |

What is claimed is:

1. A permanent magnet rotor, comprising:
   a magnetically conductive magnetic core having a circumference, with a plurality of magnet retainers positioned about the circumference;
   radially arranged and essentially tangentially magnetized permanent magnet parts, each being placed in one of the plurality of magnet retainers; and wherein the magnetic core is axially made up of at least first and second sub-cores, wherein the permanent magnet parts extend across the first sub-core and the second sub-core, and wherein some of the permanent magnets are mechanically fastened in the magnet retainers of the first sub-core and some of permanent magnets are mechanically fastened in the magnet retainers of the second sub-core, wherein when the first and second sub-cores are joined together, the permanent magnets mechanically fastened in the first sub-core are inserted in the magnet retainers of the second sub-core, forming a clearance or transition fit, and wherein when the first and second sub-cores are joined together, permanent magnets mechanically fastened in the second sub-core are inserted in the magnet retainers of the first sub-core, forming a clearance or transition fit.

2. The permanent magnet rotor according to claim 1, wherein multiple permanent magnet parts are arranged in different magnet retainers along the periphery of a sub-core and establish a stronger mechanical connection to alternate with a less strong mechanical connection in the same sub-core.

3. The permanent magnet rotor according to claim 1, wherein the stronger mechanical connection is established through injection molding, bonding, press fitting, or clamping.

4. The permanent magnet rotor according to claim 1, further comprising a rotor shaft, wherein the sub-cores are arranged on the rotor shaft and are firmly connected thereto.

5. The permanent magnet rotor according to claim 1, wherein each of the sub-cores consists of stacks of sheets or pressed metal powder.

6. The permanent magnet rotor according to claim 1, wherein each of the sub-cores has multiple permanent magnet parts inserted therein, and each of the sub-cores are formed almost identically.

\* \* \* \* \*